(12) United States Patent
Wu et al.

(10) Patent No.: US 8,305,352 B2
(45) Date of Patent: Nov. 6, 2012

(54) PHASE-TAGGED CAPACITANCE SENSING CIRCUIT AND ELECTRONIC DEVICE USING THE SAME

(75) Inventors: Hung Wei Wu, Zhonghe (TW); Ying-Jyh Yeh, Kaohsiung (TW); Chih-Yu Chang, Hsinchu (TW)

(73) Assignee: u-Pixel Technologies, Inc., Hsinchu (TW)

( * ) Notice: Subject to any disclaimer, the term of this patent is extended or adjusted under 35 U.S.C. 154(b) by 455 days.

(21) Appl. No.: 12/557,844

(22) Filed: Sep. 11, 2009

(65) Prior Publication Data

US 2011/0063227 A1 Mar. 17, 2011

(51) Int. Cl.
*G06F 3/041* (2006.01)
(52) U.S. Cl. ......... 345/173; 345/174; 345/204; 345/208
(58) Field of Classification Search .................. None
See application file for complete search history.

(56) References Cited

U.S. PATENT DOCUMENTS

| | | | | |
|---|---|---|---|---|
| 4,071,691 A * | 1/1978 | Pepper, Jr. | ................ | 178/18.05 |
| 5,440,501 A * | 8/1995 | Shimomura et al. | .......... | 702/150 |
| 5,565,658 A * | 10/1996 | Gerpheide et al. | ......... | 178/18.02 |
| 6,239,788 B1 * | 5/2001 | Nohno et al. | ................ | 345/173 |
| 6,831,622 B2 * | 12/2004 | Aoki | ............................ | 345/87 |
| 7,719,515 B2 * | 5/2010 | Fujiwara et al. | .............. | 345/156 |
| 7,956,851 B2 * | 6/2011 | Vos | ................................ | 345/174 |
| 2007/0257890 A1 * | 11/2007 | Hotelling et al. | ............. | 345/173 |
| 2008/0158175 A1 * | 7/2008 | Hotelling et al. | ............. | 345/173 |
| 2010/0060593 A1 * | 3/2010 | Krah | ............................ | 345/173 |
| 2010/0060596 A1 * | 3/2010 | Wright | ........................ | 345/173 |
| 2011/0061948 A1 * | 3/2011 | Krah et al. | ................. | 178/18.01 |
| 2011/0134076 A1 * | 6/2011 | Kida et al. | .................... | 345/174 |

* cited by examiner

*Primary Examiner* — Dismery Mercedes

(57) ABSTRACT

An electronic device includes a touch panel, a driving circuit, and a sensing circuit. The driving circuit generates a driving signal, and superposes phase information on the driving signal. The touch panel includes multiple crossing conductors, for providing a sensing signal in response to a contact of an object on one of the sensing conductors and to a driving signal applied on the sensing element. The sensing circuit includes a signal extractor and a tag detector. The signal extractor generates a demodulation signal based on the period of the driving signal, width of the phase information, and for demodulating the sensing signal by using the demodulation signal to determine a sensing value. The tag detector enables the signal extractor as soon as a magnitude of the sensing signal is over a predetermined threshold. The signal demodulates the sensing signal by using a demodulation signal whose period is the same as the driving signal to determine the sensing value. The present electronic device can determine a touch position by processing of analog signal using the demodulation signal without phase compensation.

16 Claims, 8 Drawing Sheets

PHASE-TAGGED CAPACITANCE SENSING CIRCUIT AND ELECTRONIC DEVICE USING THE SAME

BACKGROUND OF THE INVENTION

1. Field of the Invention

The present invention relates to an electronic device having a touch panel and related method of processing information on the electronic device, and more specifically, to an electronic device having a touch panel and related method capable of determining a touch position by processing of analog signal using a demodulation signal without phase compensation.

2. Description of the Related Art

In order to facilitate the carrying and utilization, touch-panels which users can touch directly have become a new trend in market development. For example, a liquid crystal display (LCD) which is applied to a personal digital assistant (PDA) is usually combined with a touch-panel to omit a keyboard or functional buttons. The touch-panel generates electric signals in response to a touch thereon to control image display of the LCD and implement function control.

Please refer to FIG. 1 showing a conventional electronic device 10 with a touch panel 11. The touch-panel 11 detects a touch location and strength of a finger or pen on a sensing array 12 of the touch panel 11. When a user touches the touch panel 11 with his finger or with a pen, the value of resistance or the value of capacitance of a sensing element of the sensing array 12 will vary. For instance, when a user presses down a resistive touch-panel 11 made of flexibility material with his finger, the distance between upper and lower electrodes becomes shortened, and the value of resistance between the two electrodes is altered. Or, when a user presses down a capacitive touch-panel 11 with his finger, the capacitance between two electrodes is affected due to the transmission characteristics of the human body, and the value of capacitance between the two electrodes is altered. Therefore, the touch location and strength of a finger or pen can be detected by detecting the variation in resistance or capacitance value.

The sensing array 12 comprises strip conductive conductors in two groups, one of which is in X direction and the other of which is in Y direction. The two groups are interlaced with each other. Or, the sensing array 12 comprises concentric and radial conductors arranged on polar coordinate. Each intersection of the two conductors substantially forms a resistance or capacitance element. When a conductor of a certain row is switched on by a driving signal via a multiplexer 16 from a control unit 14, it is allowed to detect the touch intensity of the row by serially or simultaneously measuring sensing signal values of each intersection of a column with the row by the control unit 14 through a multiplexer 18. By serially or simultaneously measuring sensing signal values of each row, an intensity matrix is obtained to determine a finger's touch location and strength.

However, sensing elements are easy to be disturbed by noise, which increases difficulty determining if variations in capacitance values result from a finger's touch or attribute to environmental noise. Take a 50 pF capacitor for example. The variation caused by a finger is 1 pF. When the 50 pF capacitor is charged to a voltage level of 2V, the voltage variation caused by the finger is approximately 40 mV, and the disturbance of noise is roughly tens of mV as well. As a result, the signal-to-noise ratio (SNR) is not strong enough, which leads to being inclined to misjudgment and even leads to misjudgment of ghost effects while there are no touches.

In addition, current touch-panels probably go with many functions in wireless communications (infrared transmission or bluetooth transmission), match with backlight liquid crystal (LC) panels, and so on. So sources of noises received by the touch-panel 11 are quite complicated, such as flicker noise (1/f noise), white noise, power noise, 50/60 Hz noise, communication microwave generated by infrared or bluetooth transmission, backlight noise, etc. In general, a low pass filter is utilized to filter high-frequency noise. For low-frequency noises such as flicker noise and 50/60 Hz noise, although low-frequency elements can be filtered out when a low pass filter is designed at lower cut off frequency, response time will be elongated as well. For instance, if the cut off frequency of a low pass filter is operated at 10 Hz to filter out 60 Hz noise, response time will delay about 0.1 second. The side effect thereof corresponds to a 0.1 second delay of conductor drawing speed. That is, a delay in response time for an application program (e.g., picture dragging) may occur after a finger touch, resulting in inconvenience in application.

In order to solve the above-mentioned problem, a modulation signal at frequency f1 is fed to the sensing element. Then a demodulation signal is used for demodulating a sensing signal produced by the sensing element, so as to generate signals at frequency (f1+f2) and frequency (f1−f2). By means of a low pass filter with a cut off frequency of (f1+f2)/2, high frequency component over (f1+f2)/2 is filtered out while the low frequency component below (f1+f2)/2 is obtained. When f1=f2 is chosen, the low-frequency component is a direct current (DC) term, i.e., a required signal. Measuring variations of the DC term is just equivalent to measuring variations of a capacitance as a finger touches. Because the modulation and demodulation technique is able to be operated on the high frequency (HF) wave bands, low-frequency noise disturbance can be thus avoided. But the conventional modulation and demodulation technique needs highly complicated analog circuit layout. Besides, additional isolation circuits are required when analog circuits and digital circuits coexist. In this way, costs will increase.

Please refer to FIG. 1 and FIG. 3. FIG. 3 depicts a functional diagram of the control unit 14 and touch panel 10 in FIG. 1. As shown in FIG. 1, trace A and trace B indicate different traces when measuring point A and point B. Amplitudes of sensing signals are varied according to different trace delays. The greater trace delay causes the smaller amplitude of the sensing signal, thereby, reducing the dynamic range of measuring variation. In a large-sized sensing array, a problem like trace delays becomes more serious. Therefore, conventionally, a use of a phase calibrator 22 is to measure all trace delays and makes phase compensation for each point. For example, when the sensing array 12 is operated under an un-touched state, a driving signal which is a square waveform from a signal generator 24 is sequentially fed to the sensing array 12 conductor by conductor, Amplitude of sensing signals are varied dependent on the trace delays. During non-touch period, phase calibrator 22 can produce square waveforms of the same frequency in diverse phases, and demodulate the received sensing signals with the square waveforms in diverse phases to obtain an autocorrelation relationship between each phase and the sensing signal. As it is, a phase corresponding to the maximum value is the required phase compensation value for the point. Afterwards, phase compensation values of all of the points are sequentially produced to generate a look-up table. In the following measurements, it is allowed to look up the table directly to act as phase compensation or to just choose several points to measure, such as four points at the four corners of the periphery, to produce phase compensation values in the manner of linear interpolation. However, phase calibration and compensation are complicated and computational consuming.

SUMMARY OF THE INVENTION

Briefly summarized, an electronic device comprises a touch panel, a driving circuit, and a sensing circuit. The touch panel comprises a plurality of sensing conductors to form a plurality of sensing elements, for providing a sensing signal in response to a contact of an object on one of the sensing elements and to a driving signal applied on the sensing element. The driving circuit coupled to the plurality of conductors is used for superposing phase information pulses on the driving signal. The sensing circuit coupled to the plurality of conductors of the touch panel is used for determining a sensing value based on the phase information pulses, and a period of the driving signal, and a change of the sensing signal. The driving circuit comprises a signal generator for generating the driving signal, and a tag generator for generating the phase information pulses, and for superposing the phase information pulses on the driving signal. The sensing circuit comprises a signal extractor and a tag detector. The signal extractor is used for generating a demodulation signal based on the period (T) of the driving signal, a width (Ttag1) of the first phase information pulse, and a width (Ttag2) of the second phase information pulse, and for demodulating the sensing signal by using the demodulation signal to determine the sensing value. The tag detector coupled to the signal generator is used for enabling the signal extractor as soon as a magnitude of the sensing signal is over a predetermined threshold.

In one aspect of the present invention, the driving signal is a square waveform, the tag generator is used for superposing the first phase information pulse and the second phase information pulse on a rising edge and a falling edge of the driving signal, respectively, so that an amplitude of the rising edge of the driving signal plus the first phase information pulse is lower than a minimum amplitude of the square waveform, and an amplitude of the falling edge of the driving signal plus the second phase information pulse is above a maximum amplitude of the square waveform. The signal generator is a square waveform generator for providing a periodical square waveform of the driving signal.

According to the present invention, each sensing element is a self-capacitance element or a mutual-capacitance element.

In still another aspect of the present invention, the demodulation signal is a square waveform in characteristic of: a period of T which complies with the driving signal, a rising edge of the demodulation signal lagging the first phase information pulse by a time period of "Ttag1+(T/2−Ttag2)/2", and a falling edge of the demodulation signal lagging the first phase information pulse by a time period of "Ttag1+T/2+(T/2−Ttag1)/2".

In yet another aspect of the present invention, the driving circuit is used for providing a plurality of driving signals with different periods to the plurality of sensing conductors.

According to the present invention, a method of processing information on an electronic device is proposed. The electronic device comprises a touch panel comprising a plurality of sensing conductors. The method comprises the steps of: providing a driving signal; superposing a first phase information pulse and a second phase information pulse on the driving signal, and transmitting the driving signal with the first phase information pulse and the second phase information pulse to the plurality of conductors of the touch panel; providing a sensing signal in response to a contact of an object on one of the sensing elements and to a driving signal applied on the sensing element; and determining a sensing value based on the first phase information pulse, the second phase information pulse, and a period of the driving signal, and a change of the sensing signal.

In one aspect of the present invention, the method further comprises: generating a demodulation signal based on the period (T) of the driving signal, a width (Ttag1) of the first phase information pulse, and a width (Ttag2) of the second phase information pulse, when a magnitude of the sensing signal is over a predetermined threshold; and demodulating the sensing signal by using the demodulation signal to determine the sensing value. The demodulation signal is a square waveform in characteristic of: a period of T which complies with the driving signal, a rising edge of the demodulation signal lagging the first phase information pulse by a time period of "Ttag1+(T/2−Ttag2)/2", and a falling edge of the demodulation signal lagging the first phase information pulse by a time period of "Ttag1+T/2+(T/2−Ttag1)/2".

The present invention will be described with references to the accompanying drawings, which show example embodiments thereof and are incorporated in the specification hereof by related references.

DETAILED DESCRIPTION OF THE PREFERRED EMBODIMENT

The present invention utilizes characteristics of orthogonal vectors. Assuming each vector of a vector group is $V_i$, where $i=0, 1, \ldots, n$. If the product of a vector with a different vector is 0 (i.e. $V_i \times V_j=0$, where $i \neq j$), and the product of a vector with itself is 1 (i.e. $V_i \times V_j=1$, where $i=j$), the this is an orthogonal vector group. When $V1=(a1, b1, c1, d1)$ and $V2=(a2, b2, c2, d2)$, then the product of $V1 \times V2$ equals to $a1 \times a2+b1 \times b2+c1 \times c2+d1 \times d2$. For example, if the vector group includes two vectors: $V1=(0, 0, 0, 1)$ and $V2=(0, 0, 1, 0)$, it is satisfied that $V1 \times V1=1$, $V1 \times V2=0$, and $V2 \times V2=1$. Therefore, V1 and V2 are orthogonal with each other.

Any signal can be represented by an orthogonal vector group as $S=c1V1+c2V2+c3V3+ \ldots +cnVn$, where $c1, c2, \ldots, cn$ are coefficients. If the environmental noises are represent as $Noise=100V1+50V2+20V3+10V4+2V5+4V6+10V7 \ldots$, where each of the vectors $V1, V2, \ldots$ indicates a component of a specific frequency band. For a known signal A, if V5 is selected as a modulation vector, then the modulated signal (i.e. input signal) Si=A*V5. As known, the signal will be coupled by the noises, therefore, an output signal So=Si+Noise=A*V5+100V1+50V2+20V3+10V4+2V5+4V6+10V7 . . . =100V1+50V2+20V3+10V4+(A+2)V5+4V6+10V7 . . . . If we utilize the same vector V5 as a demodulation vector, then the recovered signal Sr=SoxV5=100×0+50×0+20×0+10×0+(A+2)×1+4×0+10×0 . . . =A+2.

As can be seen, only a little noise will be left with the recovered signal. However, as mentioned above, to lower the noises, the low noise component (e.g. V5 in this example) should be selected as the modulation and demodulation vector.

Figure 1:
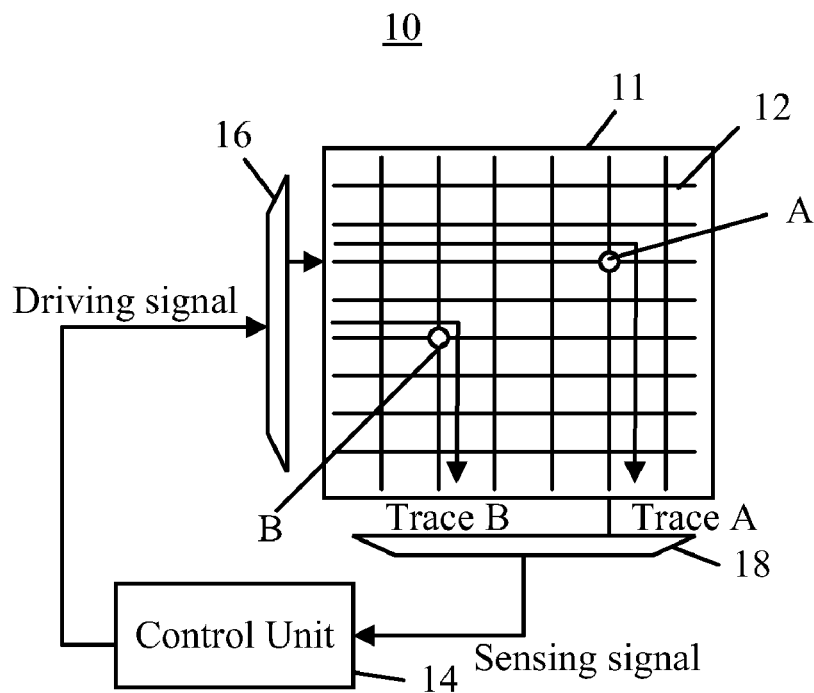
FIG. 1 shows a conventional electronic device with a touch panel.
Figure 2:
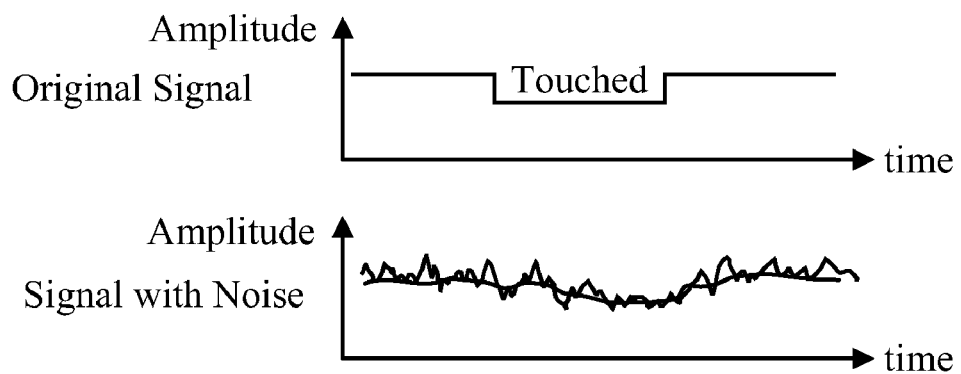
FIG. 2 depicts timing diagram of an original sensing signal and a signal with noise.
Figure 3:
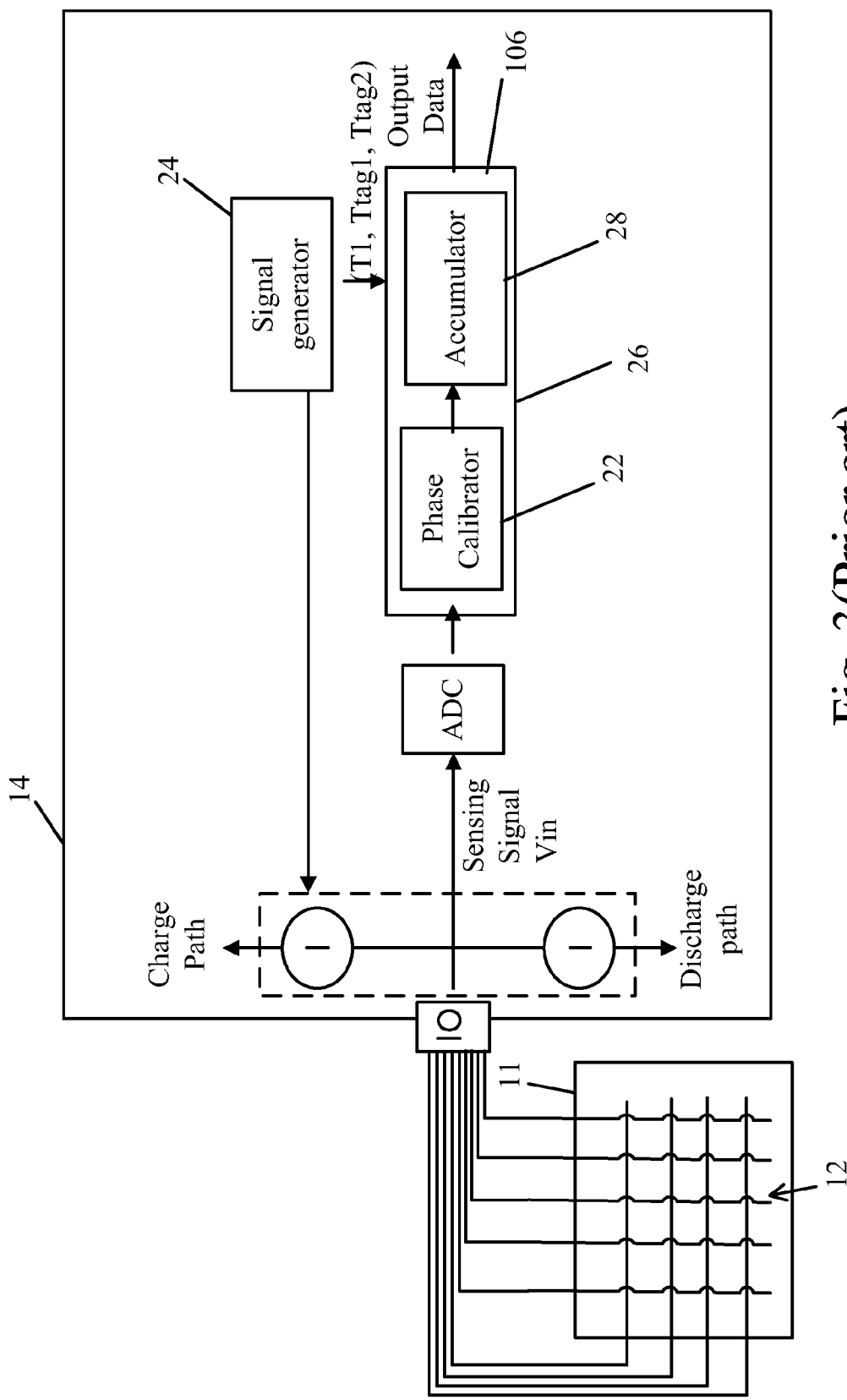
FIG. 3 depicts a functional diagram of the control unit and touch panel in FIG. 1.
Figure 4:
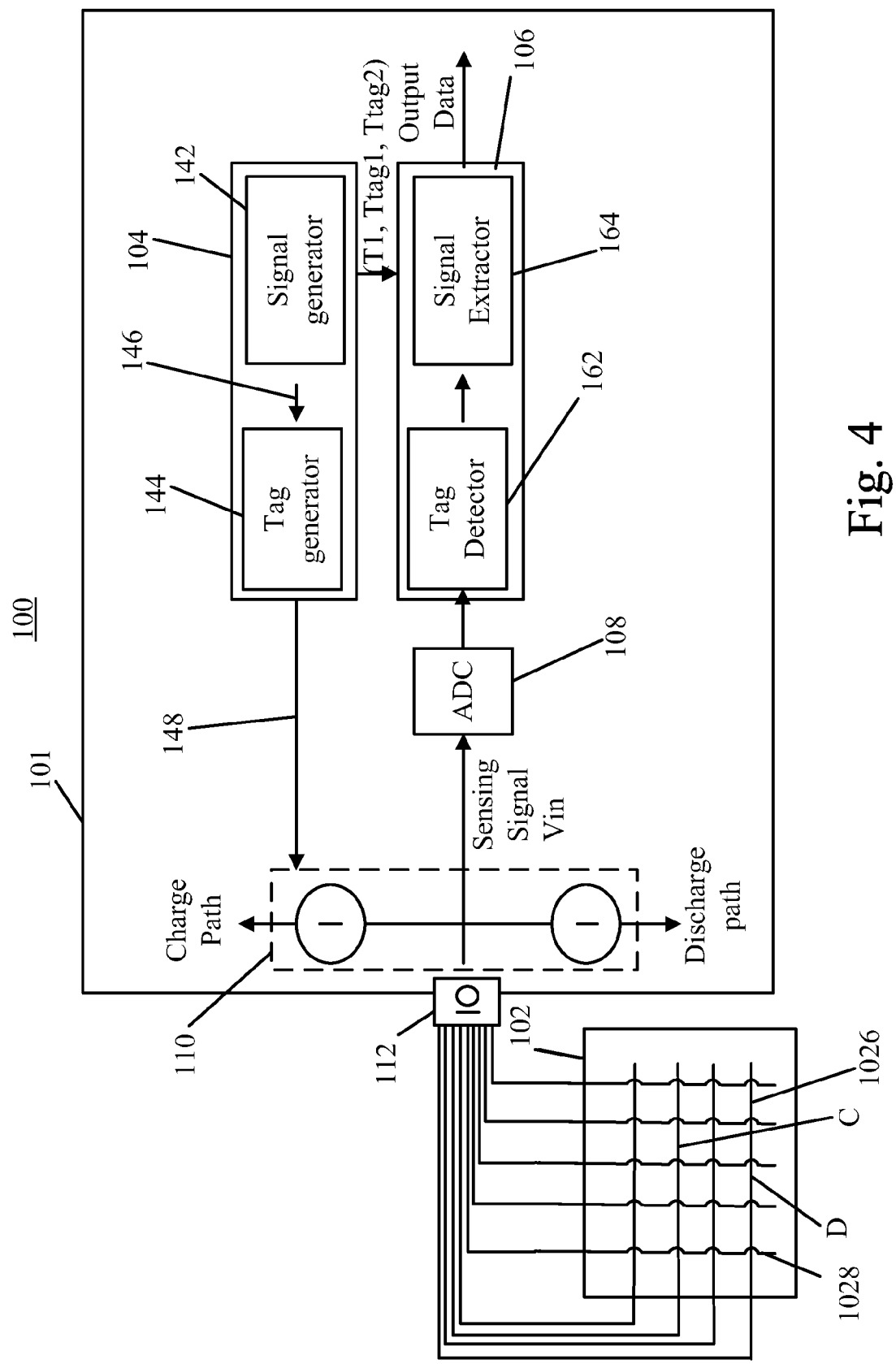
FIG. 4 is a function block diagram of an electronic device according to the first embodiment of the present invention.

Please refer to FIG. 4. FIG. 4 is a function block diagram of an electronic device 100 according to the first embodiment of the present invention. The electronic device 100 comprises a control unit 101 and a touch panel 102. The control unit 101 comprises a driving circuit 104, a sensing circuit 106, an analog-to-digital converter (ADC) 108, a current driver 110, and an I/O channel 112. The touch panel 102 comprises a plurality of sensing conductors 1026 (i.e. rows) and 1028 (i.e. columns). Preferably, the sensing conductors 1026 and 1028 are in a matrix arrangement. The sensing conductors 1026 and 1028 are electrical conductors to transmit electrical signals. The driving circuit 104 outputs driving signals to current driver 110. The sensing circuit 106 receives sensing signals. The control unit 101 is implemented by a digital signal processor (DSP) or a software program code. A self capacitance is positioned in a column of the sensing conductors 1028 or a row of the sensing conductors 1026 so as to form a two axes coordinates to indicate touching positions. Each self capacitance can be changed due to the presence of an object. In the self-capacitance touch panel, a change in capacitance typically occurs at a row or a column of sensing conductors 1026 or 1028 when a user places the object such as a finger in close proximity to it. The control unit 101 determines a touch position according to the a voltage variation of the sensing signals due to a change of capacitance based on a function of dV/V=−dC/C, where V indicates voltage on the sensing conductors 1026 or 1028 and C indicates capacitance of the sensing conductors 1026 or 1028. When a touch occurs, a capacitance coupling phenomenon is produced on the sensing conductors 1026 or 1028 so that the voltage of the sensing signal is varied. The control unit 101 determines the touch position according to the voltage variations of the sensing signals.

Figure 5:
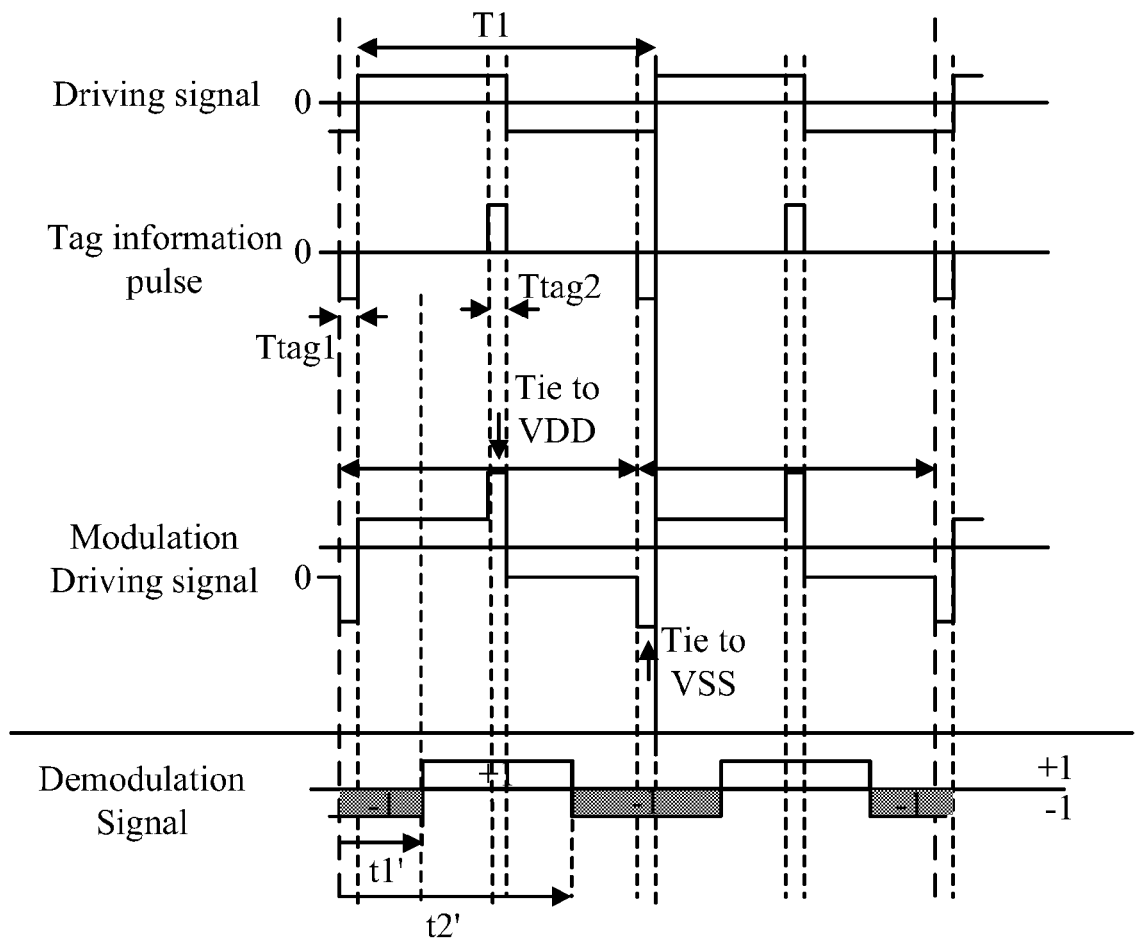
FIG. 5 shows a timing diagram of signals generated by the elements of the driving circuit in FIG. 4.

Please refer to FIG. 4 and FIG. 5. FIG. 5 shows a timing diagram of signals generated by the driving circuit 104 in FIG. 4. The driving circuit 104 comprises a signal generator 142 and a tag generator 144. The signal generator 142 is a square wave generator to generate a driving signal 146 in a periodical waveform of a period T1. The tag generator 144 can tag phase information in the driving signal for demodulation.

Refer to FIG. 5. The tag generator 144 coupled to the signal generator 142 superposes a first phase information pulse tag1 to the rising edge of the driving signal 146 and a second phase information pulse tag2 to the falling edge of the driving signal 146. The amplitude of the rising edge of the driving signal 146, which superposes the first phase information pulse tag1, is lower than the minimum amplitude of the square wave; the amplitude of the falling edge of the driving signal 146, which superposes the second phase information pulse tag2, is higher than the maximum amplitude of the square wave. Preferably, both of the pulse width Ttag1 of the first phase information pulse tag1 and pulse width Ttag2 of the second phase information pulse tag2 are very short and equivalent to each other. Take a DSP which operates at 100 MHz for example. The pulse width can be set as Ttag1=Ttag2=0.1 μs=100 ns. Finally the modulation driving signal 148 is produced.

The driving circuit 104 outputs a modulation driving signal 148 which carries the phase information pulses tag1 and tag2 to drive a current driver 110 to charge and discharge the sensing conductors 1026 or 1028 of the touch panel 102. The modulation driving signal 148 can control current driver 110, so the first phase information pulse tag1 can indicate first position for sensing circuit to identify it and reset driving current to minima power level VSS, and then followed by charging path. The second phase information pulse tag2 can indicate second position for sensing circuit to identify it and set driving current to maximum power level VDD, and then followed by discharging path.

It is notified that, the driving circuit 104 also transmits information like period T1 of the driving signal 146, the pulse width Ttag1 of the first phase information pulse, and the pulse width Ttag2 of the second phase information pulse tag2, to the sensing circuit 106 to ensure that the sensing circuit 106 generates a proper demodulation signal W.

In addition, the signal generator 142 can generate driving signals 146 with different periods (i.e., different frequencies) to drive different sensing conductors 1026 or 1028. For example, Period T1 of the driving signal 146 is used to detect conductor C of the sensing conductors 1026 or 1028. And a value of period T1 is then transmitted to the signal extractor 164 so as to form a demodulation signal W having the same period T1 to extract an sensing signal of conductor C of the sensing conductors 1026 or 1028; period T2 of the driving signal 146 is used to detect conductor D of the sensing conductors 1026 or 1028 and a value of Period T2 is transmitted the signal extractor 164 so as to form another demodulation signal W having the same period T2 to extract an sensing signal of conductor D of the sensing conductors 1026 or 1028.

Figure 6:
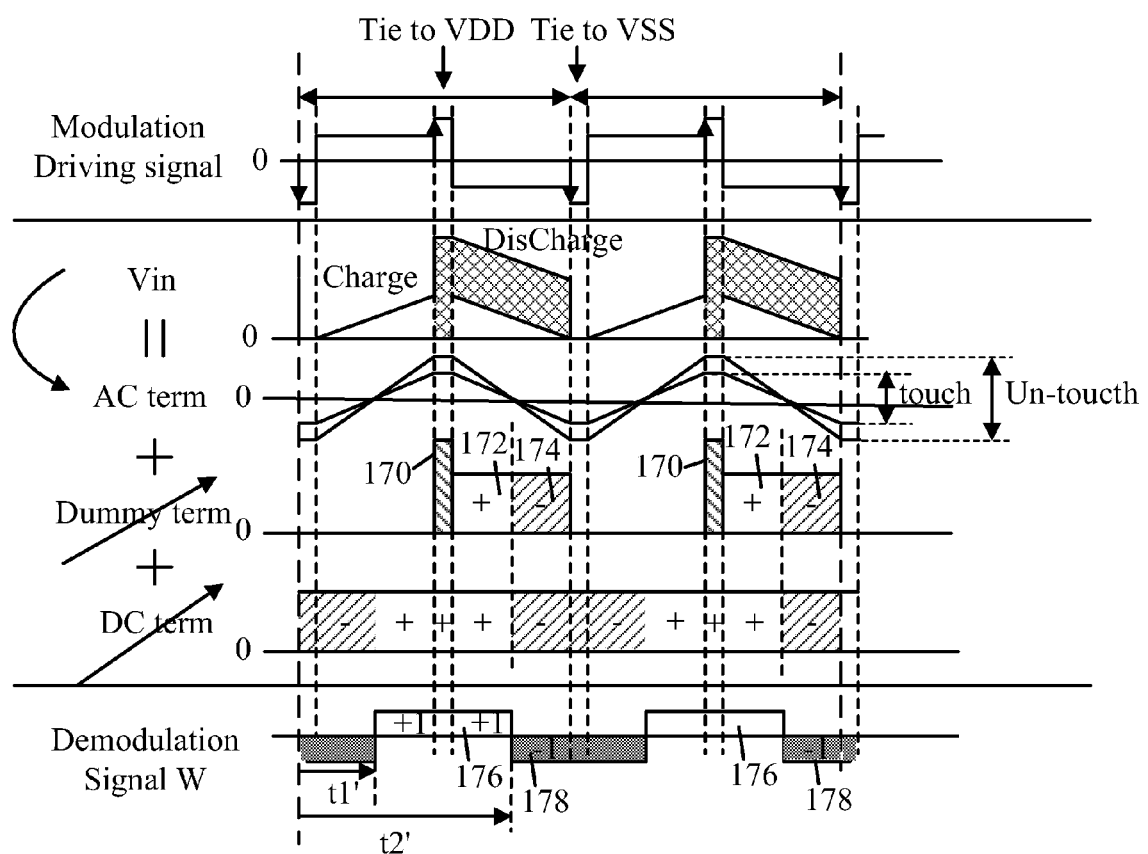
FIG. 6 shows a timing diagram of an sensing signal Vin, a modulation driving signal, and a demodulation signal in FIG. 4.

Please refer to FIG. 4 and FIG. 6 at the same time. FIG. 6 shows a timing diagram of a sensing signal Vin, the modulation driving signal, and the demodulation signal W in FIG. 4. During the time when the current I produced by the modulation driving signal 148 is to charge and discharge the sensing conductors 1026 or 1028 therefore, if a finger touches one of the sensing conductors 1026 or 1028 and induces the corresponding capacitance to change, according to well-know charge equation Q=I×T=C×V, under a constant current I and a given time T, we have dV/V=−dC/C. That is to say, when the capacitance C changes, the voltage V (i.e., the amplitude of the sensing signal Vin) changes as well. So the voltage change of the sensing signal Vin can indicate whether a finger touch occurs or not.

The sensor 106 comprises a tag detector 162 in addition to the signal extractor 164. In one embodiment, the tag detector 162 uses peak detector to enable the signal extractor 164 to measure the sensing signal Vin as soon as an magnitude of the sampled sensing signal Vin exceeds a predetermined threshold. because the tag generator 144 generates the phase information pulses tag1, tag2 and superposes them on the driving signal 146, the tag detector 162 is capable of determining the accuracy period T1 and phase of the driving signal 146 in accordance with the superposition of the phase information pulses tag1, tag2 on the driving signal 146. Preferably, a sufficiently significant amplitude difference between the phase information pulses tag1, tag2 and the driving signal 146 is proposed to strengthen the effect of detection.

In another embodiment, the control unit 104 further comprises a memory 122 to store the waveform of the sensing signal Vin. The tag detector 162 enables the signal extractor 164 when performing an autocorrelation by the given phase information pulses tag1, tag2 on the sensing signal Vin to indicate the start point to demodulate.

The signal extractor 164 generates a demodulation signal W based on the period T1 of the driving signal 146, the width Ttag1 of the first phase information pulse tag1 and width Ttag2 of the second phase information pulse tag2, all from the driving circuit 104. The demodulation signal W may be a square waveform (or sine waveform) with a digital value pair (1, −1), whose period complies to the period T1 of the driving signal 146, a rising edge of the demodulation signal W lagging a time period t1' of "Ttag1+(T/2−Ttag2)/2" from the first phase information pulse tag1, and a falling edge of the demodulation signal W lagging a time period t2' of "Ttag1+T/2+(T/2−Ttag2)/2" from the first phase information pulse tag1.

Figure 7:
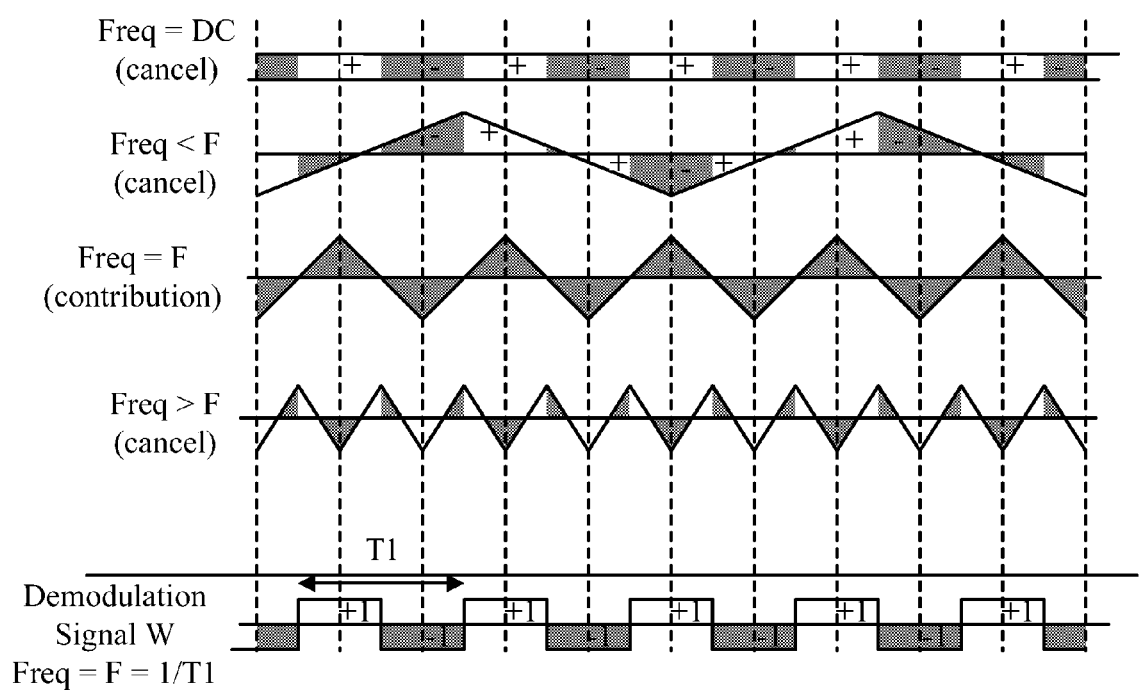
FIG. 7 illustrates an example of the demodulation signal, and frequency constituents of DC, higher than f, equal to f and lower than f of the sensing signal Vin.

FIG. 7 illustrates the principle of demodulation in signal extractor 164, the signal extractor 164 extracts the substantially the same frequency component of sensing signal Vin by an orthogonalization computing with the demodulating signal. It could be expressed as $$\sum_{i}^{M}(Vin_i * W_i)$$

in DSP coding, where the sensing signal Vin is sensing signal and W is demodulation signal, and M is total measuring points, M also means total measuring time. As shown in FIG. 7, firstly, by performing orthogonalization computing with the demodulation signal W whose period is T1, the frequency component of sensing signal which is less than F will cancel to each other (F=1/T1 in this case); the frequency component of sensing signal which is larger than F will cancel to each other in the same way; the DC component of sensing signal also cancel to each other. Finally, the signal extractor 164 extracts the frequency component of sensing signal which is substantially the same as demodulation signal W.

As shown in FIG. 6, the sensing signal composed of three components: AC term, dummy term and DC term, As it is, the sensing signal Vin received by the sensing circuit 106 is not a triangle-shaped waveform, yet is composed of a dummy term with the phase information pulses tag1, tag2, a DC term, an AC term, and noise. Fortunately, as shown in FIG. 6, because the product of the portion 172 multiplying the portion 176 of the demodulation signal W is canceled by the product of the portion 174 multiplying the portion 178 of the demodulation signal W, beside that, the DC term and AC terms whose frequency are not equal to demodulation signal W are filtered out, only pulses 170 of the dummy term which corresponds to the phase information pulses tag1, tag2, and the AC term and little noise exist. Apparently, most noise is filtered out Additionally, the pulses 170 of the dummy term is also ignorable, because the pulse wide of the pulse 170 of the dummy term is very short and constant, no matter the capacitance of the sensing conductors 1026 or 1028 is varied or not, i.e. the touch panel 102 is touched or not.

As a result, the signal extractor 164 can determine the capacitance of the sensing conductors 1026 or 1028 by demodulating the sensing signal Vin with the demodulation signal W. Accordingly, once a contact of a finger or other object on the touch panel 102 induces a change of the capacitance of the sensing conductors 1026 or 1028, the control unit 101 is able to determine the contact positions and strength of applying force by detecting the variety of the capacitance (sensing value) of the sensing conductors 1026 or 1028.

Figure 8:
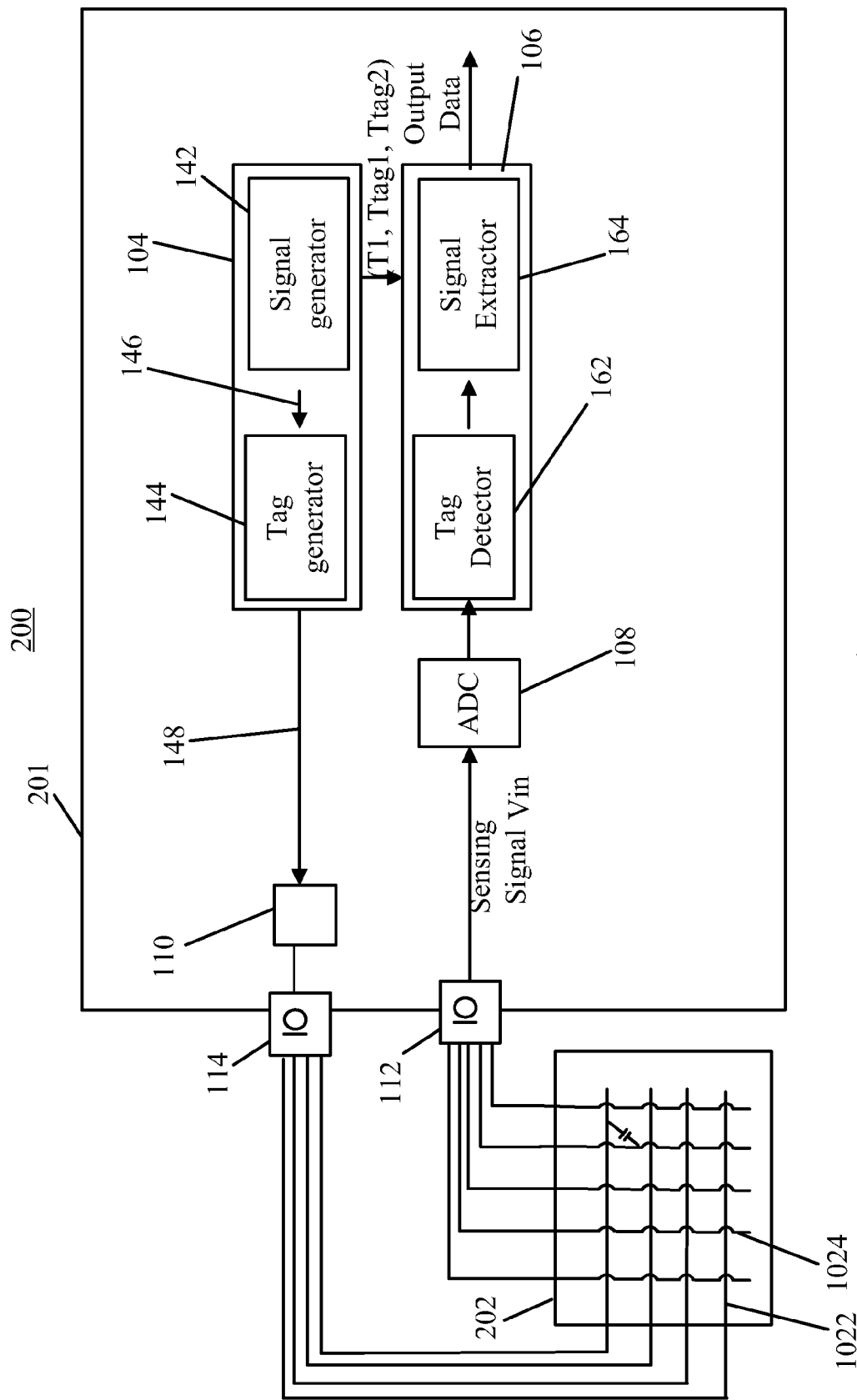
FIG. 8 is a function block diagram of an electronic device according to the second embodiment of the present invention.

Please refer to FIG. 8, FIG. 8 illustrates a function block diagram of an electronic device 200 and touch panel 202 according to the second embodiment of the present invention. It is noted that, for simplicity, elements in FIG. 8 that have the same function as that illustrated in FIG. 4 are provided with the same item numbers as those used in FIG. 4. The conductors comprise two layers of electrical conductors. One of the two layers comprises a plurality of driving conductors 1022 (e.g. the rows of the touch panel 202), and the other layer comprises a plurality of sensing conductors 1024 (e.g. the columns of the touch panel 202). The intersections of the driving conductors 1022 and the sensing conductors 1024 are not physically and electrically contacted, forming the mutual capacitance sensing element of the touch panel 202. The driving circuit 104, coupled to a voltage controller 110 outputs driving signals. The voltage controller 110 converts the digital modulation driving signal into analog voltage. Each of the driving conductors 1022 via the I/O channel 114 transmits the analog modulation driving signal to the touch panel 202. The sensing circuit 106, coupled to each of the sensing conductors 1024 via the I/O channel 112, receives sensing signals. The control unit 201 is implemented by a digital signal processor (DSP) or a software program code. The driving circuit 104 takes turns in outputting driving signals to drive each of the driving conductors 1022. When fingers, touch pens, or other objects make one or more contacts of the touch panel 202 simultaneously, a certain point of the intersection of sensing conductors 1024 and the driving conductors 1022 is bound to induce a capacitance coupling phenomenon to cause the sensing signals generated by the sensing conductors 1024 to produce voltage variations. After each of the driving conductors 1022 is scanned one by one, an exact touch position can be obtained. The control unit 201 determines a touch position according to the voltage variations of the sensing signals. For brevity, the driving circuit 104 and the sensing circuit 106 have the same function as that illustrated in FIG. 4 and are described above, so operation of the driving circuit 104 and the sensing circuit 106 is omitted.

Figure 9:
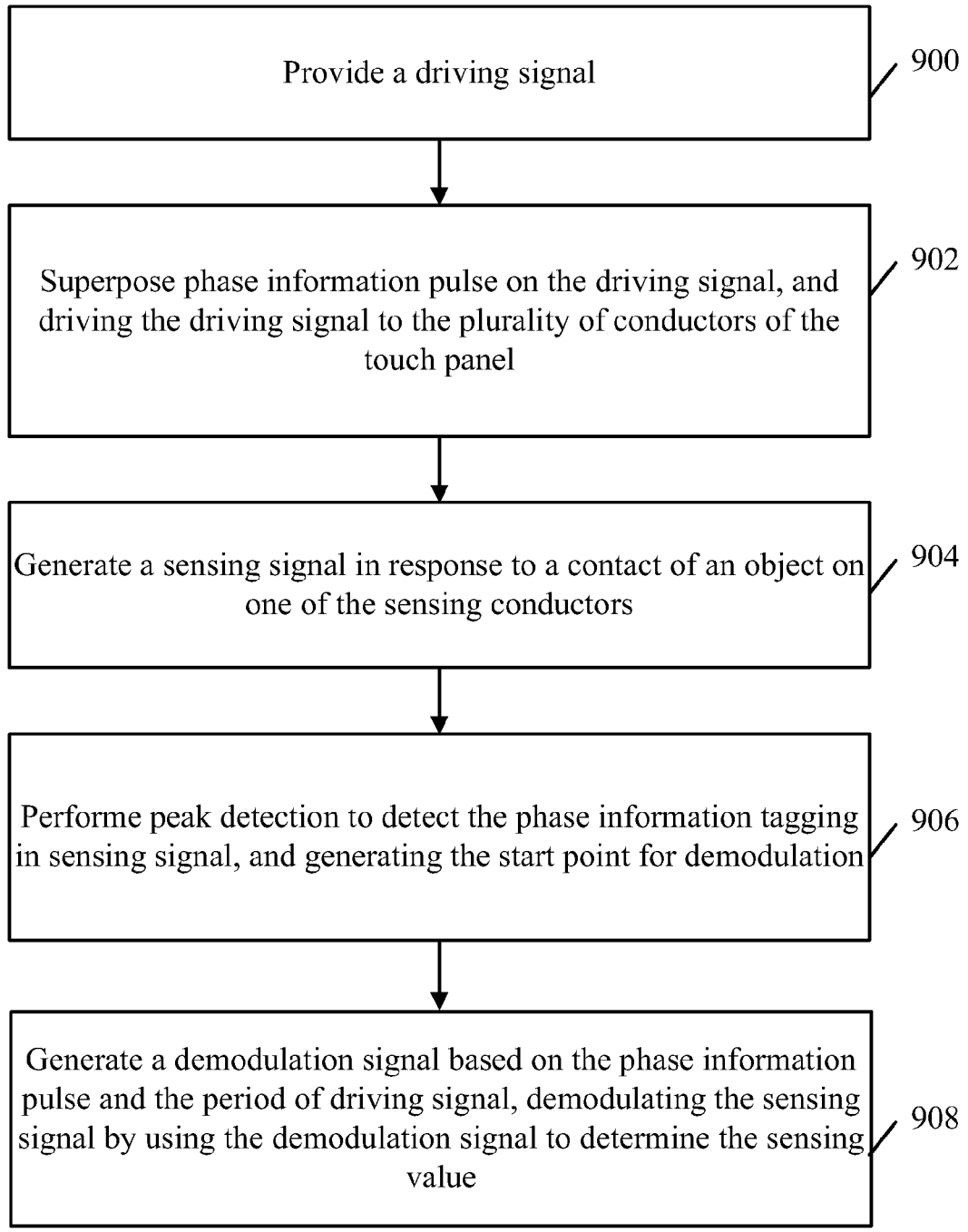
FIG. 9 is a flowchart of a method of processing information on an electronic device according to the present invention.

Please refer to FIG. 9, FIG. 9 is a flowchart of a method of processing information on an electronic device according to the present invention, the method comprises the steps of:

Step 900: providing a driving signal 146 with a period T1 by using the signal generator 142.

Step 902: superposing phase information on the driving signal 146 by using the tag generator 144, and driving the plurality of conductors of the touch panel 102 with the driving signal.

Step 904: generating a sensing signal Vin in response to a contact of an object on one of the sensing conductors 1026 or 1028.

Step 906: performing peak detection to detect the phase information tagging in sensing signal, and generating the start point for demodulation by using the tag detector 162.

Step 908: generating a demodulation signal W based on the phase information and the period of driving signal 146; demodulating the sensing signal Vin by using the demodulation signal W to generate a sensing value Although the present invention has been explained by the embodiments shown in the drawings described above, it should be understood to the ordinary skilled person in the art that the invention is not limited to the embodiments, but rather the various changes or modifications thereof are possible without departing from the spirit of the invention. For example, in addition to the mutual-capacitance or self-capacitance touch panel used in the aforementioned invention, the resistance touch panel can also be used. The signal generator 104 may also be a pseudorandom noise code (PN code) generator to produce a square waveform having random durations produced by using random numbers.

The present invention has been described with reference to certain preferred and alternative embodiments which are intended to be exemplary only and not limited to the full scope of the present invention as set forth in the appended claims. Accordingly, the scope of the invention shall be determined only by the appended claims and their equivalents.

What is claimed is:

1. An electronic device comprising:
   a touch panel comprising a plurality of sensing conductors;
   a driving circuit for sending a square waveform driving signal which is modulated with a predetermined period and superposing phase information on it, the driving circuit comprising:
      a signal generator for generating the driving signal; and
      a tag generator coupled to the signal generator, for generating the phase information and for superposing the phase information on a rising edge or a falling edge of the driving signal, so that an amplitude of the rising edge of the driving signal plus the phase information pulse is lower than a minimum amplitude of the square waveform, or an amplitude of the falling edge of the driving signal plus the phase information is above a maximum amplitude of the square waveform; and
   a sensing circuit for accepting sensing signal and determining a sensing value based on the phase information and the same period of the driving signal.

2. The electronic device of claim 1 wherein each sensing element is a self-capacitance element.

3. The electronic device of claim 1, wherein each sensing element is a mutual-capacitance element.

4. The electronic device of claim 1, wherein the sensing circuit comprises:
   a signal extractor for generating a demodulation signal based on the period (T) of the driving signal and a width of the phase information, and for demodulating the sensing signal by using the demodulation signal to determine the sensing value; and
   a tag detector coupled to the signal generator for enabling the signal extractor as soon as a magnitude of the sensing signal is over a predetermined threshold.

5. The electronic device of claim 4 further comprising a memory for storing a waveform of the sensing signal, wherein the tag detector enables the signal extractor when performing an autocorrelation computing the sensing signal with the phase information.

6. The electronic device of claim 1, further comprising an analog-to-digital converter coupled between the sensing circuit and the conductors of the touch panel for sampling the sensing signal.

7. The electronic device of claim 1, wherein the sensing circuit and the driving circuit are implemented by a digital signal processor.

8. The electronic device of claim 1, wherein the signal generator is a pseudorandom noise code generator for providing a square waveform produced by random numbers.

9. The electronic device of claim 1, wherein each sensing element is a resistive element.

10. The electronic device of claim 1, wherein
    the driving circuit is used for providing a plurality of driving signals with different periods to the plurality of conductors;
    the sensing circuit is used for determining a plurality of sensing values, each sensing value associated with the phase information, and the period of the received driving signal, and a change of the sensing signal for each conductor.

11. A method of processing information on an electronic device, the electronic device comprising a touch panel comprising a plurality of sensing conductors, the method comprising:
    providing a driving signal with a period;
    superposing phase information on the driving signal, and driving the driving signal to the plurality of conductors of the touch panel, wherein the phase information is superposed on a rising edge or a falling edge of the driving signal, so that an amplitude of the rising edge of the driving signal plus the phase information pulse is lower than a minimum amplitude of the square waveform, or an amplitude of the falling edge of the driving signal plus the phase information is above a maximum amplitude of the square waveform;
    generating a sensing signal in response to a contact of an object on one of the sensing conductor;
    performing peak detection to detect the phase information tagging in the sensing signal, and generating the start point for demodulation; and
    generating a demodulation signal based on the phase information and the period of driving signal, and demodulating the sensing signal by using the demodulation signal to determine a touch position of the touch panel.

12. The method of claim 11, wherein each sensing element is a self-capacitance element.

13. The method of claim 11, wherein each sensing element is a mutual-capacitance element.

14. The method of claim 11, wherein the driving signal is a square waveform produced by random numbers.

15. The method of claim 11, wherein each sensing element is a resistive element.

16. The method of claim 11, further comprising:
    generating a demodulation signal based on the period (T) of the driving signal, a width (Ttag1) of the first phase information pulse, and a width (Ttag2) of the second phase information pulse, when a magnitude of the sensing signal is over a predetermined threshold;
    demodulating the sensing signal by using the demodulation signal to determine the sensing value.

* * * * *